United States Patent
John Wilson et al.

(10) Patent No.: US 11,540,271 B2
(45) Date of Patent: *Dec. 27, 2022

(54) NR UPLINK TRANSMIT BEAM SELECTION BASED ON PDCCH/PDSCH RECEIVE BEAMS

(71) Applicant: QUALCOMM Incorporated, San Diego, CA (US)

(72) Inventors: Makesh Pravin John Wilson, San Diego, CA (US); Tao Luo, San Diego, CA (US); Xiao Feng Wang, San Diego, CA (US); Sony Akkarakaran, Poway, CA (US); Sumeeth Nagaraja, Los Altos, CA (US); Shengbo Chen, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/021,162

(22) Filed: Sep. 15, 2020

(65) Prior Publication Data

US 2020/0413388 A1 Dec. 31, 2020

Related U.S. Application Data

(63) Continuation of application No. 15/913,718, filed on Mar. 6, 2018, now Pat. No. 10,779,273.
(Continued)

(51) Int. Cl.
*H04W 72/04* (2009.01)
*H04W 72/08* (2009.01)
(Continued)

(52) U.S. Cl.
CPC ........ *H04W 72/044* (2013.01); *H04B 7/0695* (2013.01); *H04B 7/088* (2013.01);
(Continued)

(58) Field of Classification Search
CPC . H04W 72/044; H04W 72/082; H04W 7/088; H04W 52/365; H04W 72/085;
(Continued)

(56) References Cited

U.S. PATENT DOCUMENTS 8,983,547 B2   3/2015   Jeong et al.
9,363,683 B2   6/2016   Raghavan et al.
(Continued)

FOREIGN PATENT DOCUMENTS

CN   101714886 A   5/2010
CN   103891161 A   6/2014
(Continued)

OTHER PUBLICATIONS

Huawei et al., "Discussion on NR UL MIMO", 3GPP TSG RAN WG1 Meeting #86, R1-167208, Gothenburg, Sweden Aug. 22-26, 2016, 4 Pages.
(Continued)

*Primary Examiner* — Brenda H Pham
(74) *Attorney, Agent, or Firm* — Patterson + Sheridan, L.L.P.

(57) ABSTRACT

Certain aspects of the present disclosure provide techniques for selecting an uplink (UL) transmit beam by a user equipment (UE). A UE may receive, from a base station (BS), one or more beamformed downlink signals using one or more receive beams. The UE may select an uplink transmit beam based, at least in part, on the one or more beamformed downlink signals. The UE may transmit an uplink signal using the selected uplink transmit beam.

27 Claims, 9 Drawing Sheets

Related U.S. Application Data

(60) Provisional application No. 62/470,188, filed on Mar. 10, 2017, provisional application No. 62/469,710, filed on Mar. 10, 2017.

(51) Int. Cl.

| | |
|---|---|
| *H04L 5/00* | (2006.01) |
| *H04B 7/08* | (2006.01) |
| *H04B 7/06* | (2006.01) |
| *H04W 52/36* | (2009.01) |
| *H04W 52/42* | (2009.01) |

(52) U.S. Cl.
CPC .............. *H04L 5/005* (2013.01); *H04L 5/006* (2013.01); *H04L 5/0048* (2013.01); *H04W 72/042* (2013.01); *H04W 72/046* (2013.01); *H04W 72/082* (2013.01); *H04L 5/0023* (2013.01); *H04L 5/0053* (2013.01); *H04W 52/365* (2013.01); *H04W 52/42* (2013.01); *H04W 72/085* (2013.01)

(58) Field of Classification Search
CPC ...... H04W 52/42; H04L 5/0048; H04L 5/006; H04L 5/005; H04L 5/0053; H04L 5/0023
See application file for complete search history.

(56) References Cited

U.S. PATENT DOCUMENTS

| | | | |
|---|---|---|---|
| 9,497,002 | B2 | 11/2016 | Wei |
| 9,942,886 | B1 | 4/2018 | John et al. |
| 10,779,273 | B2 * | 9/2020 | John Wilson ........ H04B 7/0695 |
| 2009/0258654 | A1 | 10/2009 | Hagerman et al. |
| 2013/0040684 | A1 | 2/2013 | Yu et al. |
| 2013/0182683 | A1 | 7/2013 | Seol et al. |
| 2013/0217404 | A1 | 8/2013 | Jung |
| 2013/0286960 | A1 | 10/2013 | Li et al. |
| 2014/0192917 | A1 | 7/2014 | Nam et al. |
| 2014/0323143 | A1 * | 10/2014 | Jung .................... H04B 7/0617 455/562.1 |
| 2015/0124738 | A1 | 5/2015 | Ramakrishna et al. |
| 2015/0358115 | A1 | 12/2015 | Wang et al. |
| 2016/0099763 | A1 | 4/2016 | Chen |
| 2016/0174244 | A1 | 6/2016 | Kim et al. |
| 2016/0219475 | A1 | 7/2016 | Kim |
| 2016/0277976 | A1 | 9/2016 | Takahashi et al. |
| 2016/0294463 | A1 | 10/2016 | He |
| 2016/0295502 | A1 | 10/2016 | Yoon et al. |
| 2016/0295561 | A1 | 10/2016 | Papasakellariou |
| 2016/0360425 | A1 | 12/2016 | Huang et al. |
| 2017/0111806 | A1 | 4/2017 | Roh et al. |
| 2017/0164377 | A1 | 6/2017 | Ho et al. |
| 2017/0181193 | A1 | 6/2017 | Park et al. |
| 2018/0288753 | A1 | 10/2018 | Kishiyama et al. |
| 2019/0253108 | A1 | 8/2019 | Zhang et al. |
| 2019/0334599 | A1 | 10/2019 | Davydov |

FOREIGN PATENT DOCUMENTS

| | | | |
|---|---|---|---|
| CN | 105519167 | A | 4/2016 |
| EP | 3273730 | A1 | 1/2018 |
| EP | 3306831 | A1 | 4/2018 |
| JP | 2015092698 | A | 5/2015 |
| TW | 201628355 | A | 8/2016 |
| WO | 2008004922 | A1 | 1/2008 |
| WO | 2014107012 | A1 | 7/2014 |
| WO | 2016086144 | A1 | 6/2016 |
| WO | WO-2016086144 | A1 * | 6/2016 .......... H04B 7/0617 |
| WO | 2016152655 | A1 | 9/2016 |
| WO | 2016190653 | A1 | 12/2016 |
| WO | 2017136732 | A1 | 8/2017 |
| WO | 2017138980 | A1 | 8/2017 |
| WO | 2017151876 | A1 | 9/2017 |

OTHER PUBLICATIONS

Intel Corporation: "Uplink MIMO in New Radio Interface", 3GPP TSG RAN WG1 Meeting #85, R1-164191, Nanjing, China May 23-27, 2016, pp. 1-5.
International Preliminary Report on Patentability—PCT/US2018/021348, The International Bureau of WIPO—Geneva, Switzerland, dated Sep. 19, 2019.
International Search Report and Written Opinion—PCT/US2018/021348—ISA/EPO—dated Jun. 13, 2018.
International Search Report and Written Opinion—PCT/US2017/050135—ISA/EPO—dated Nov. 28, 2017.
Mitsubishi Electric: "Beam Control Operation for Common Channels/Signals in NR", 3GPP TSG-RAN WG1 #86, 3GPP Draft; R1-166228, Initial Access and Mobility, 3rd Generation Partnership Project (3GPP), Mobile Competence Centre; 650, Route Des Lucioles; F-06921, Sophia-Antipolis Cedex; France, vol. RAN WG1, Gothenburg, Sweden; Aug. 22-Aug. 26, 2016, Aug. 21, 2016 (Aug. 21, 2016), pp. 1-10, XP051140131, Retrieved from the Internet: URL: http://www.3gpp.org/ftp/Meetings_3GPP_SYNC/RAN1/Docs/ [retrieved on Aug. 21, 2016].
NTT DOCOMO: "Discussion on Multi-Antenna Transmission of Synchronization and Reference Signals", 3GPP TSG RAN WG1 Meeting #85, R1-165180, Nanjing, China May 23-27, 2016, pp. 1-5.
ZTE: "Beamformed Random Access in NR", 3GPP TSG RAN WG1 Meeting #86, 3GPP Draft; R1-166419, Beam Formed Random Access in NR, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22-Aug. 26, 2016, Aug. 21, 2016 (Aug. 21, 2016), XP051140220, 8 Pages, Retrieved from the Internet: URL: http://www.3gpp.org/ftp/Meetings_3GPP_SYNC/RAN1/Docs/[retrieved on Aug. 21, 2016].
Taiwan Search Report—TW107107663—TIPO—dated Oct. 6, 2021.
Huawei., et al., "Further Details on UL LBT to Enable UE Multiplexing of Uplink Transmissions", 3GPP Draft; 3GPP TSG RAN WG1 Meeting #84bis, R1-162102, 3rd Generation Partnership Project (3GPP), Mobile Competence Centre, 650, Route Des Lucioles, F-06921 Sophia-Antipolis Cedex, France, vol. RAN WG1, No. Busan, Korea, Apr. 11-Apr. 15, 2016, Apr. 2, 2016 (Apr. 2, 2016), XP051079949, 7 Pages, Retrieved from the Internet: URL: http://www.3gpp.org/ftp/tsg_ran/WG1_RL1/TSGR1_84b/Docs/ [retrieved on Apr. 2, 2016].
MCCSUPPORT: "Final Report of 3GPP TSG RAN WG1 #86 v1.0.0 ", 3GPP TSG RAN WG1 Meeting #86bis, R1-1608562, Lisbon, Portugal, Oct. 10-14, 2016,pp. 1-154.
Taiwan Search Report—TW111100646—TIPO—dated Feb. 14, 2022.

* cited by examiner

NR UPLINK TRANSMIT BEAM SELECTION BASED ON PDCCH/PDSCH RECEIVE BEAMS

CLAIM OF PRIORITY

The present application for patent claims is a continuation application of U.S. patent application Ser. No. 15/913,718, filed Mar. 6, 2018 which claims benefit of U.S. Provisional Patent Application Ser. No. 62/469,710, filed Mar. 10, 2017 and U.S. Provisional Patent Application Ser. No. 62/470,188, filed Mar. 10, 2017, assigned to the assignee hereof and hereby expressly incorporated by reference herein.

BACKGROUND

Field of the Disclosure

Certain aspects of the present disclosure relate to communication systems, and more particularly, for selecting an uplink transmit beam for transmitting a PUSCH or PUCCH.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for selecting an uplink transmit beam based on a receive beam used to receive downlink signals. Correspondingly, aspects relate to methods and apparatus for monitoring beams in an effort to receive the uplink transmission.

Certain aspects of the present disclosure provide a method for wireless communication that may be performed, for example, by a UE. The method generally includes receiving, from a base station (BS), one or more beamformed downlink signals using one or more receive beams, selecting an uplink transmit beam based, at least in part, on the one or more beamformed downlink signals, and transmitting an uplink signal using the selected uplink transmit beam.

Certain aspects of the present disclosure provide a method for wireless communication that may be performed, for example, by a BS. The method generally includes transmitting, to a user equipment (UE) one or more beamformed downlink signals, transmitting an indication, to the UE, to select an uplink transmit beam based, at least in part, on the transmitted one or more beamformed downlink signals, and receiving the uplink transmission from the UE.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
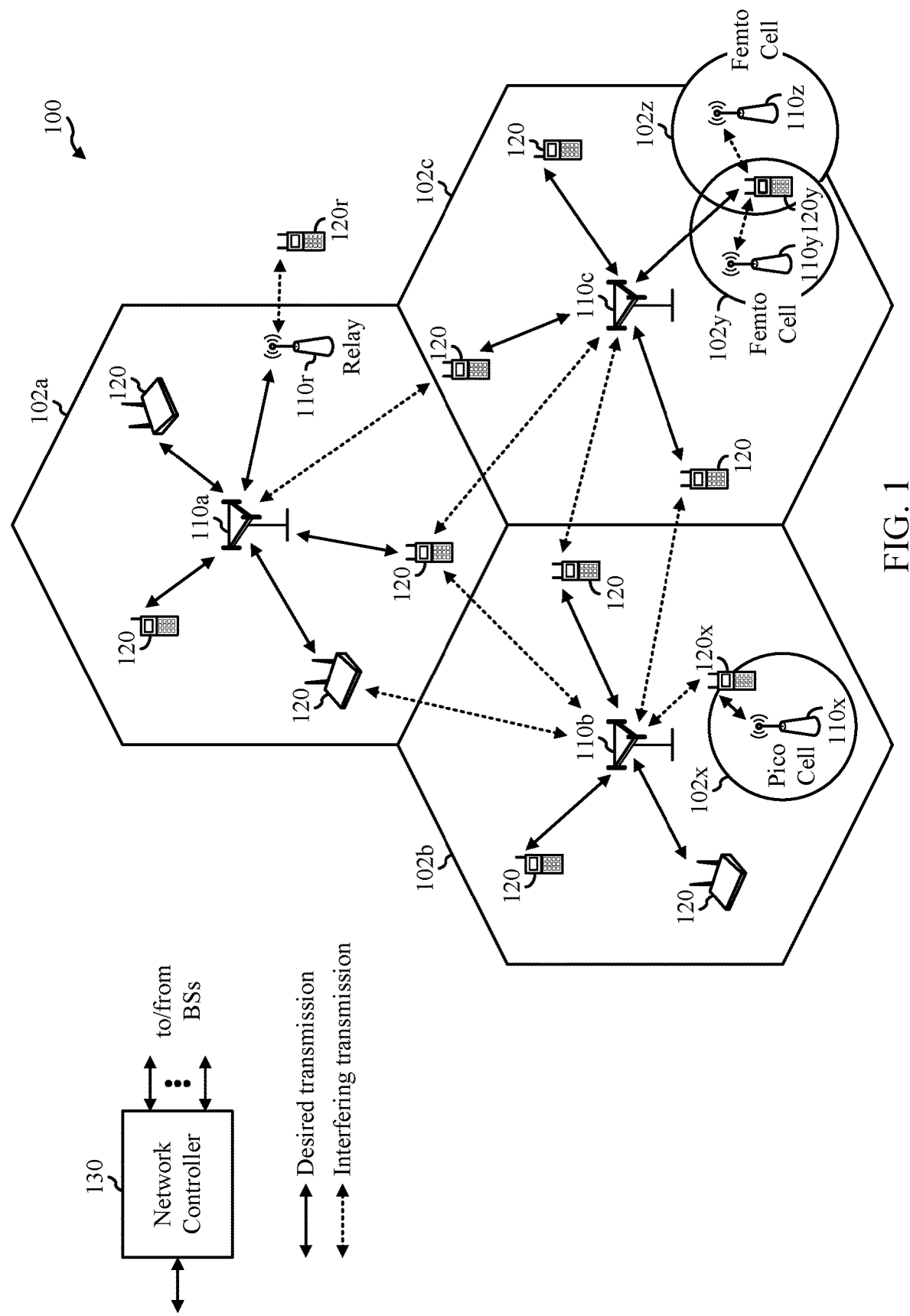
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure provide techniques and apparatus for supporting selection of uplink transmit beams used by a UE. More specifically, a UE may receive one or more beamformed downlink signals. Based on the received signals (the receive beams used to receive the DL signals), the UE may select a transmit beam for uplink, beamformed transmissions. A UE's receive and transmit beam may be associated, linked, and/or the same.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network.

Aspects of the present disclosure relate to selecting an UL beam based on received downlink beamformed signals.

millimeter-wave (mmWave) communications bring gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

Spectrum bands in high frequencies (e.g., 28 GHz, may be referred to as mmWave) provide large bandwidths capable of delivering multi-Gbps data rates, as well as extremely dense spatial reuse which may increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmWaves operate, small wavelengths enable a large number of antenna elements in a relatively small form factor. Unlike microwave links, which may cast very wide footprints, reducing the achievable amount of reuse of the same spectrum within a geographical area, mmWave links cast very narrow beams. This characteristic of mmWave may be leveraged to form directional beams that may send and receive more energy to overcome propagation and path loss challenges.

These narrow, directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked.

With more antenna elements and narrow beams, it becomes increasingly helpful to transmit signals in the appropriate direction, in an effort to maximize the received signal energy.

In a beamformed wireless communication system, a wireless device may transmit and receive using directional beams. As will be described in more detail herein, a UE may receive, from a BS one or more downlink signals. The UE may receive the downlink signals using one or more receive beams at the UE. Aspects of the present disclosure provide techniques for a UE to determine the uplink beam to use to transmit an uplink signal. The beam a UE uses to receive a downlink signal and the beam the UE uses to transmit an UL signal may be related, associated with each other, or the same beam.

According to aspects a UE may receive from a BS, one or more beamformed downlink signals using one or more receive beams. The UE may select an uplink transmit beam based, at least in part, on the one or more beamformed downlink signals. The UE may transmit an uplink signal using the selected uplink transmit beam. The uplink signal may be a PUCCH or PUSCH transmission.

Correspondingly, a BS may transmit, to a UE one or more beamformed downlink signals. The BS may transmit an indication, to the UE, to select an uplink transmit beam based, at least in part, on the transmitted one or more beamformed downlink signals. The BS may receive the uplink transmission from the UE.

UEs 120 may be configured to perform the operations 900 and other methods described herein and discussed in more detail below for transmit beam selection. Base station (BS) 110 may comprise a transmission reception point (TRP), Node B (NB), 5G NB, access point (AP), new radio (NR) BS, etc.). The NR network 100 may include the central unit. The BS 110 may perform the operations 1000 and other methods described herein.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
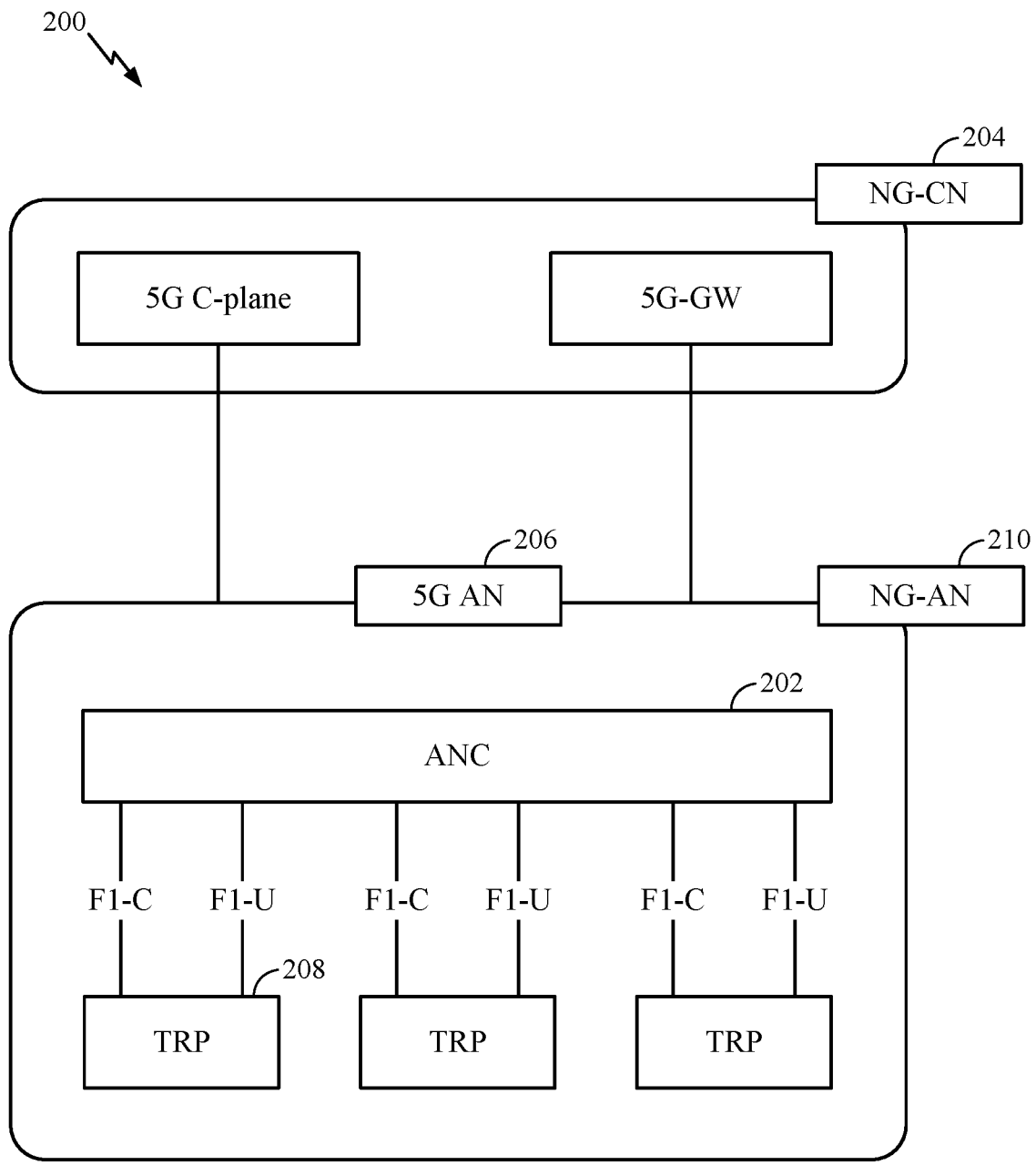
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
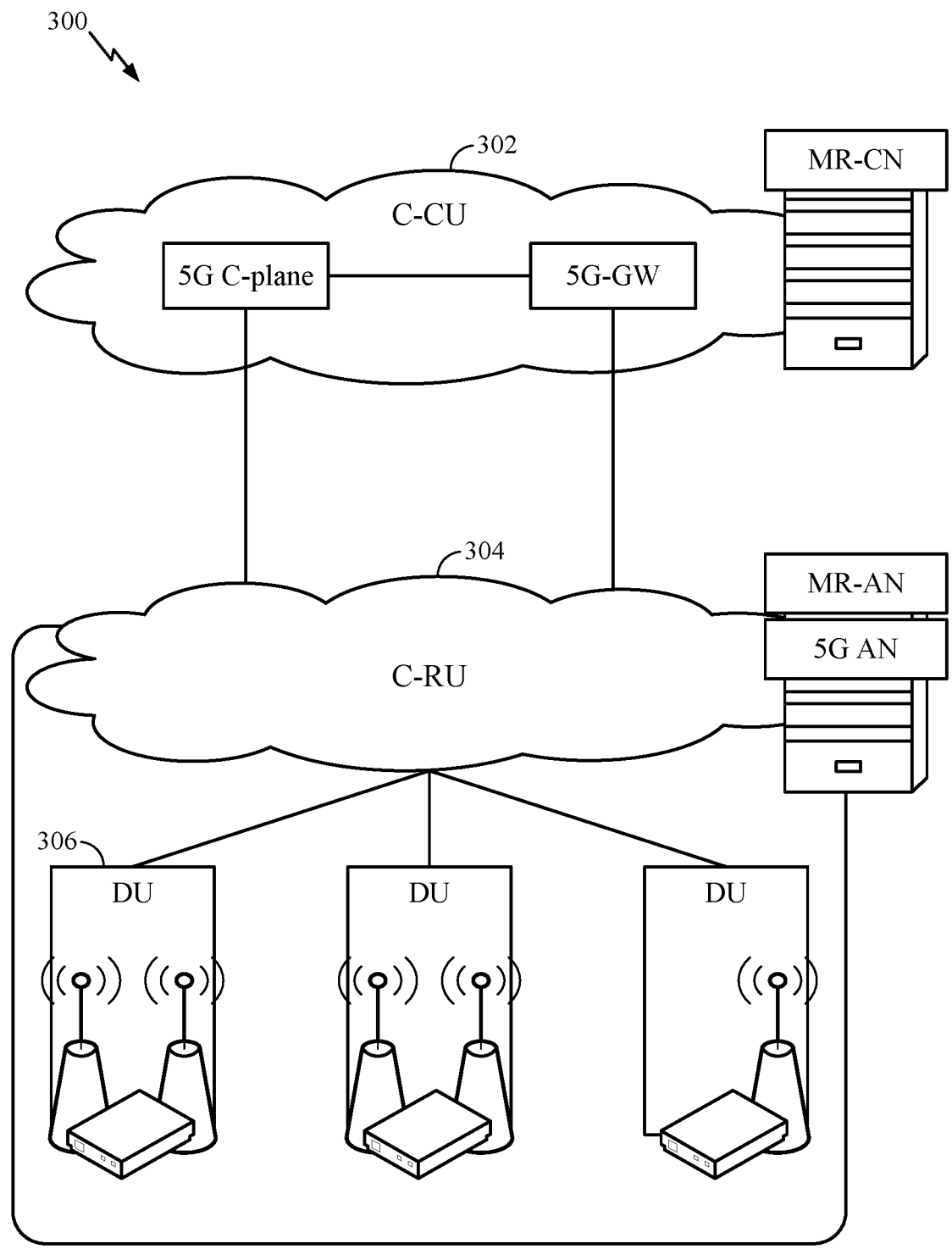
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
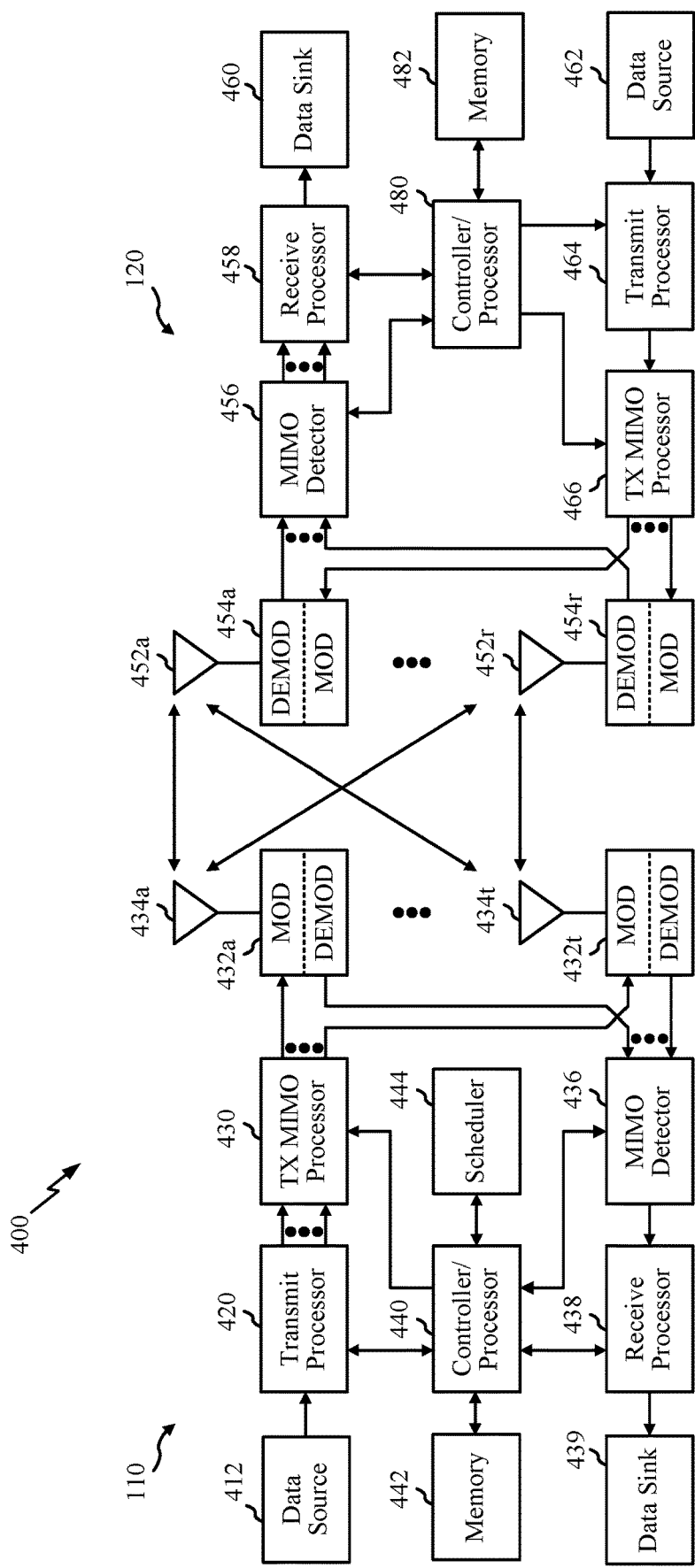
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure including the operations 900 and 1000 illustrated in FIGS. 9-10. For example, antennas 452, Tx/Rx 454, processors 466, 458, 464, and/or controller/processor 480 of the UE 120 and/or antennas 434, Tx/RX 432, processors 430, 420, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein. The processor 480 and/or other processors and modules at the UE 120 may also perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
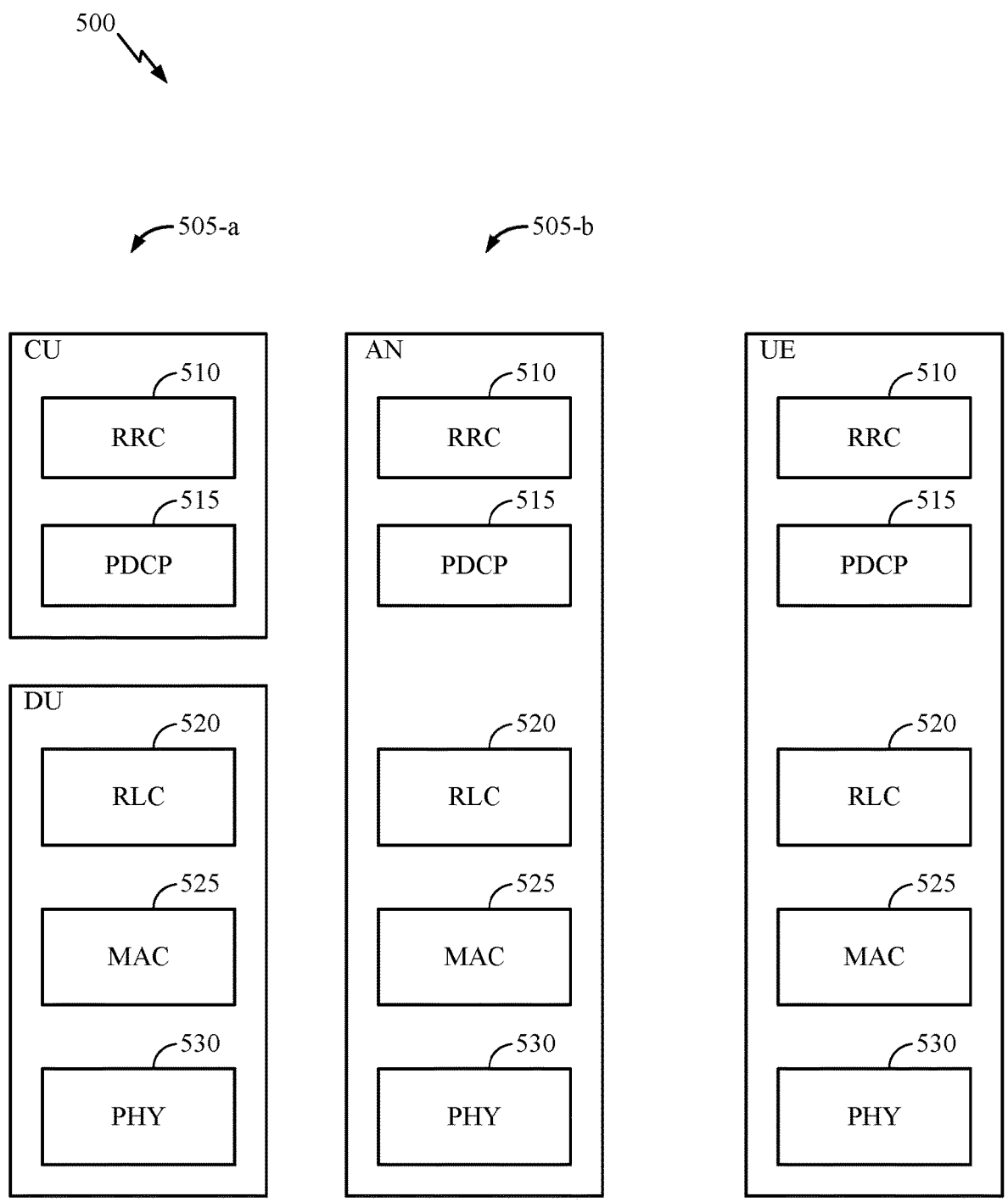
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
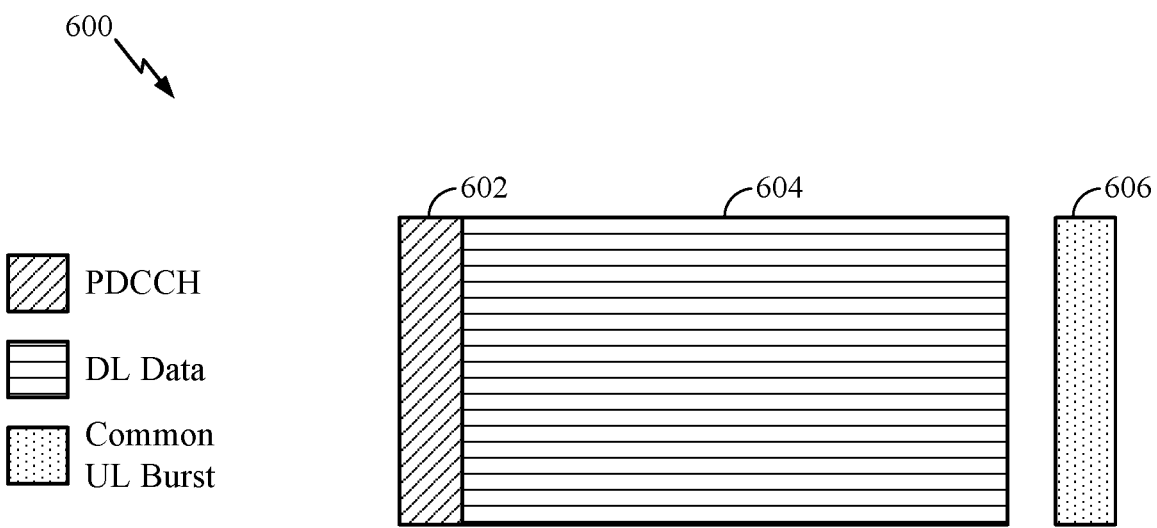
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
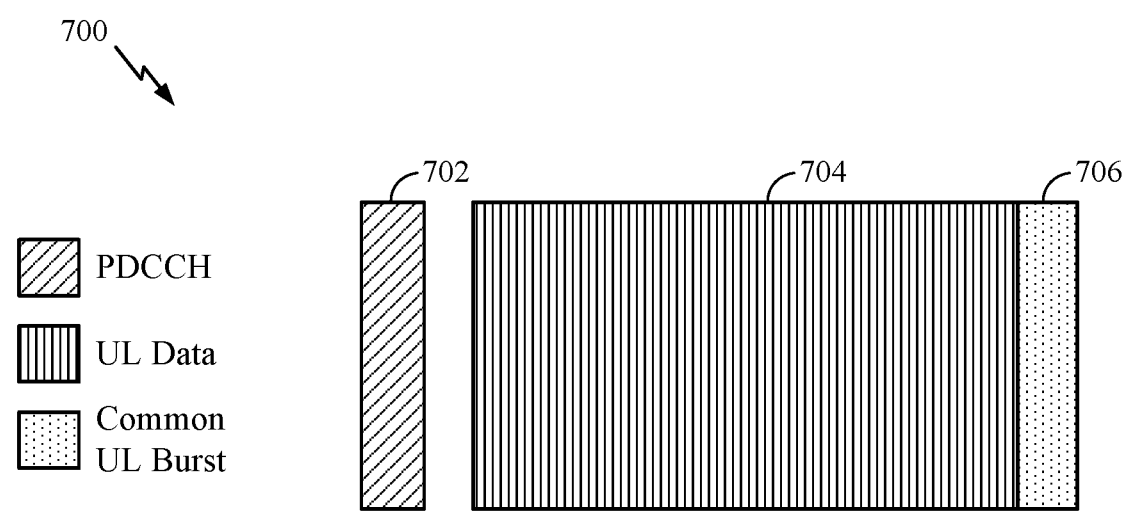
FIG. 7 illustrates an example of an UL-centric subframe, in accordance with certain aspects of the present disclosure.

FIG. 7 is a diagram 700 showing an example of an UL-centric subframe. The UL-centric subframe may include a DL control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example UL Transmit Beam Selection Based on PDCCH/PDSCH Rx Beams

In beamformed communication, signals are transmitted using directional beams. As an example, PDCCH and/or PDSCH may be transmitted using beams which may include transmit beams used by a BS which are received using receive beams at a UE. In some cases, PDCCH and PDSCH may be transmitted using different downlink beams. Further, a UE may transmit on the PUCCH and/or PUSCH using beams. For example, the UE may transmit uplink control information on the PUCCH and/or PUSCH using an uplink transmit beam.

Aspects of the present disclosure describe how a UE may select the uplink transmit beam to use. As described herein, the UE may select an uplink transmit beam based, at least in part, on one or more corresponding receive beams used to receive the PDCCH and/or PDSCH (or any signals signal transmitted by a quasi co-located port at the transmitter).

Figure 8:
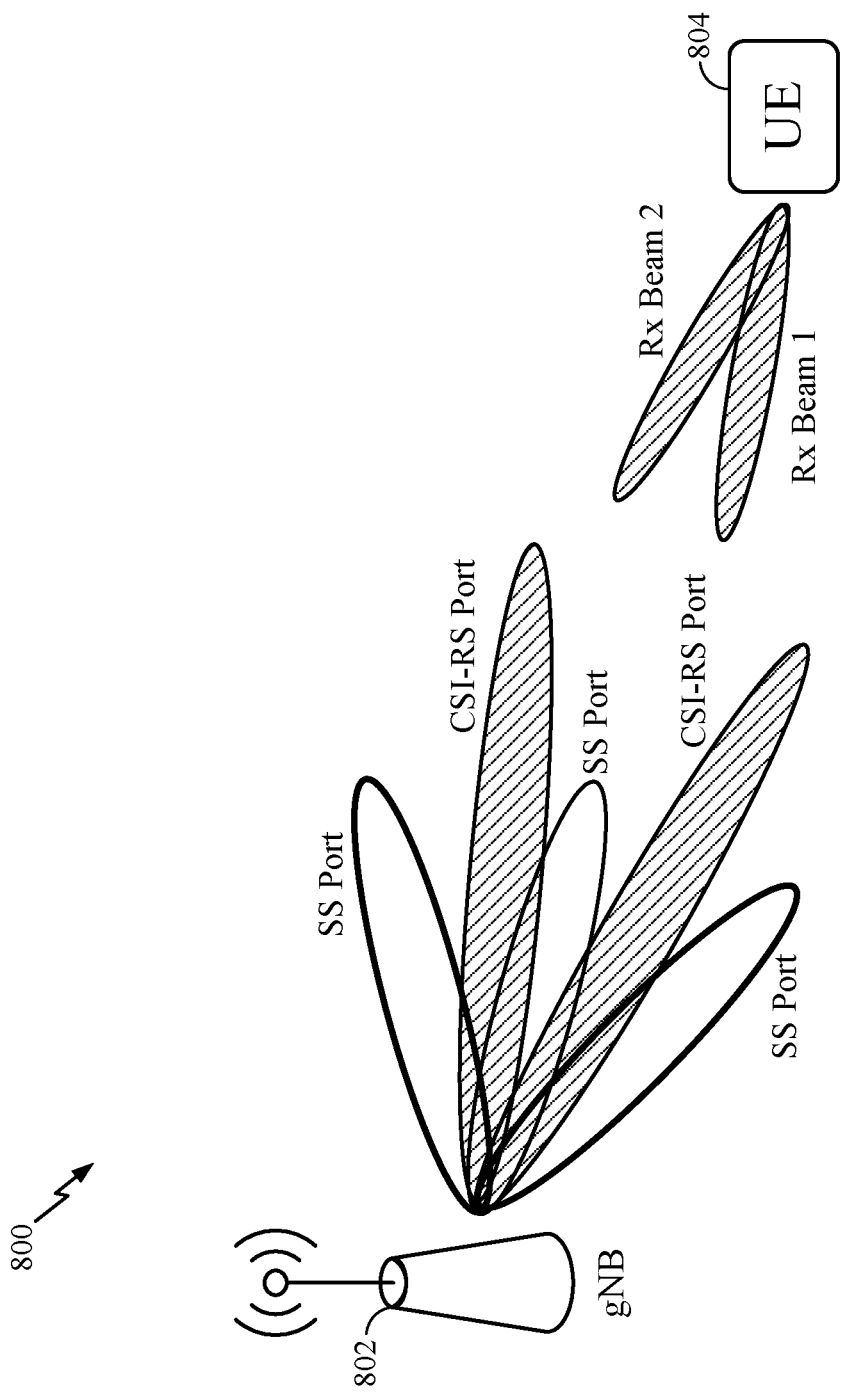
FIG. 8 illustrates an example of a beamformed communication.

FIG. 8 illustrates an example 800 of beamformed communication. A beam may be associated with one or more (beamformed) antenna ports, and an antenna port may be associated with a reference signal (RS). According to an example, each beam may be associated with multiple CSI-RS/SS ports. The multiple ports may be referred to as a "port set." Antenna ports are logical entities (as opposed to physical antennas) distinguished by their reference signal sequences. Multiple antenna port signals may be transmitted on a single transmit antenna. Additionally or alternatively, a single antenna port may be spread across multiple transmit antennas.

If one antenna port is quasi co-located with another antenna port, properties of a signal from one of the antenna ports (or a radio channel corresponding to the antenna port) are similar to those of a signal from the other antenna port (or a radio channel corresponding to the antenna port). The properties may include Doppler spread, Doppler shift, timing offset-related average delay, delay spread, average gain, and the like. Thus, if two antenna ports are quasi co-located, the UE may assume that large-scale properties of the channel over which a symbol on one antenna port is conveyed may be inferred from the channel over which a symbol on the other antenna port is conveyed. In some cases, the QCL may also include spatial parameters. For example, a UE may be instructed that the spatial Rx filter used to receive Port A can also be used to receive Port B.

Referring to FIG. 8, according to one example, a transmitter 802 (TRP, gNB) may have one or more SS ports. Additionally, the BS may have one or more CSI-RS ports. For each port, the UE 804 may use one or more receive beams (Rx Beam 1, Rx Beam 2) to receive the transmitted DL reference signal. The UE may measure a signal strength of a DL reference signal using one the one or more receive beams.

Figure 9:
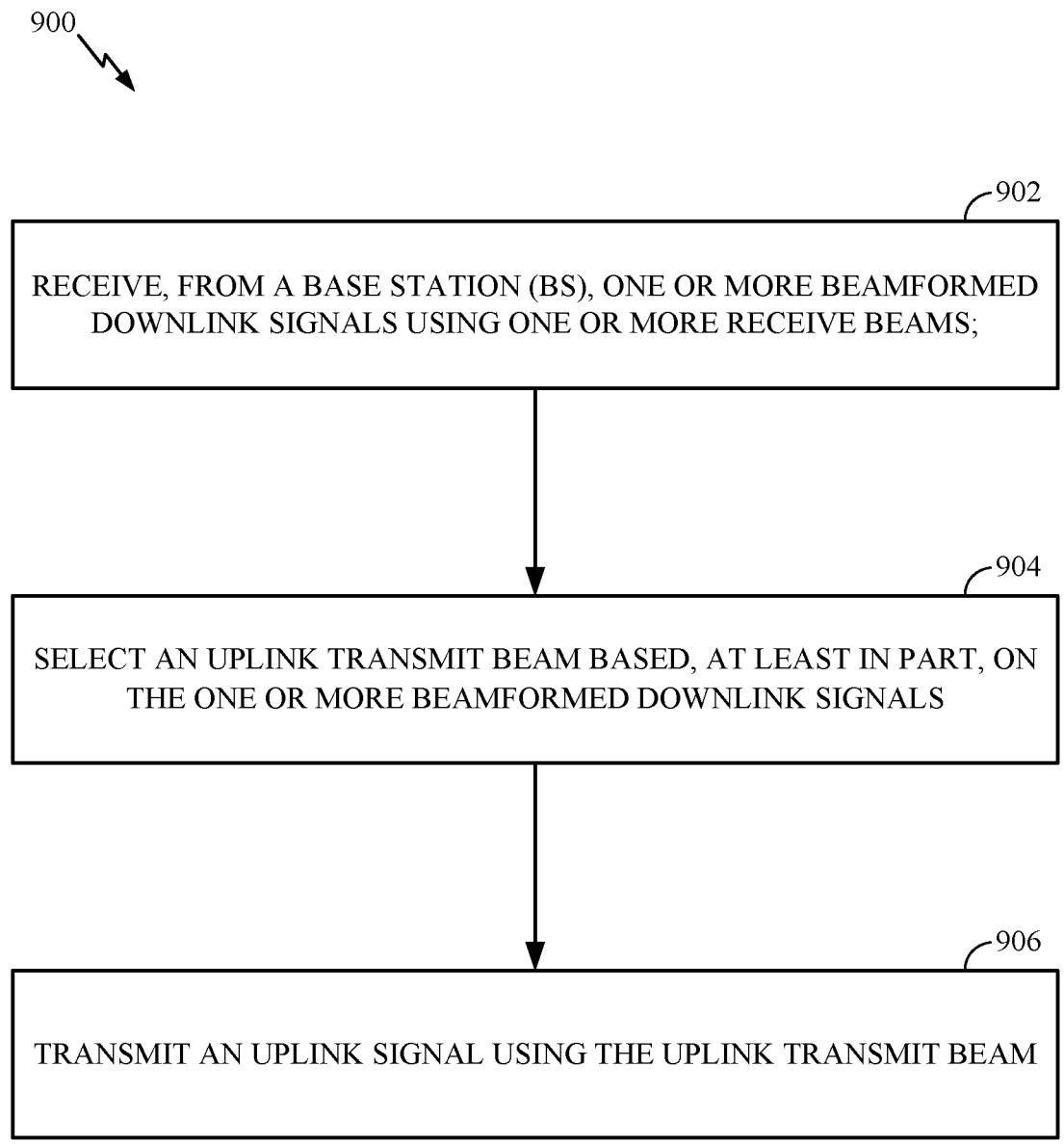
FIG. 9 illustrates example operations performed by a UE, in accordance with certain aspects of the present disclosure.

FIG. 9 illustrates example operations 900, which may be performed by UE, according to aspects of the present disclosure. The UE may include one or more modules of UE 120 illustrated in FIG. 4.

At 902, the UE may receive, from a BS, one or more beamformed downlink signals using one or more receive beams. At 904, the UE may select an uplink transmit beam based, at least in part, on the one or more beamformed downlink signals. At 906, the UE may transmit an uplink signal using the selected uplink transmit beam.

In accordance with one or more cases, a UE may determine an uplink (UL) transmit (Tx) beam, based on a spatial receive (Rx) filter (or spatial Rx Beam) used to receive a downlink (DL) signal. For example, if a UE has beam correspondence (or perfect reciprocity), the UE may use the same antenna weights used to receive a DL signal (say PDCCH) to transmit a UL signal (say PUCCH). Another example implementation may include using an associated codeword for the UL signal if a certain codeword in a codebook was used to receive a DL signal. In some cases, this may further include calibrating before and identifying associated UL Tx beam weights for Rx beam weights.

In some cases, selecting the uplink transmit beam is further based on one or more of a physical downlink control channel (PDCCH) beam or a physical downlink shared channel (PDSCH) beam. In some cases, selecting the uplink transmit beam is further based on an explicit signaling in a downlink control information (DCI).

In some cases, selecting the uplink transmit beam may include additional operations. For example, selecting the uplink transmit beam may further include determining the UE has reached a maximum power limit based on the PDCCH beam being selected, and selecting the PDSCH beam based on the determination, wherein an available power headroom of the selected PDSCH beam accommodates the transmit power requirement.

Figure 10:
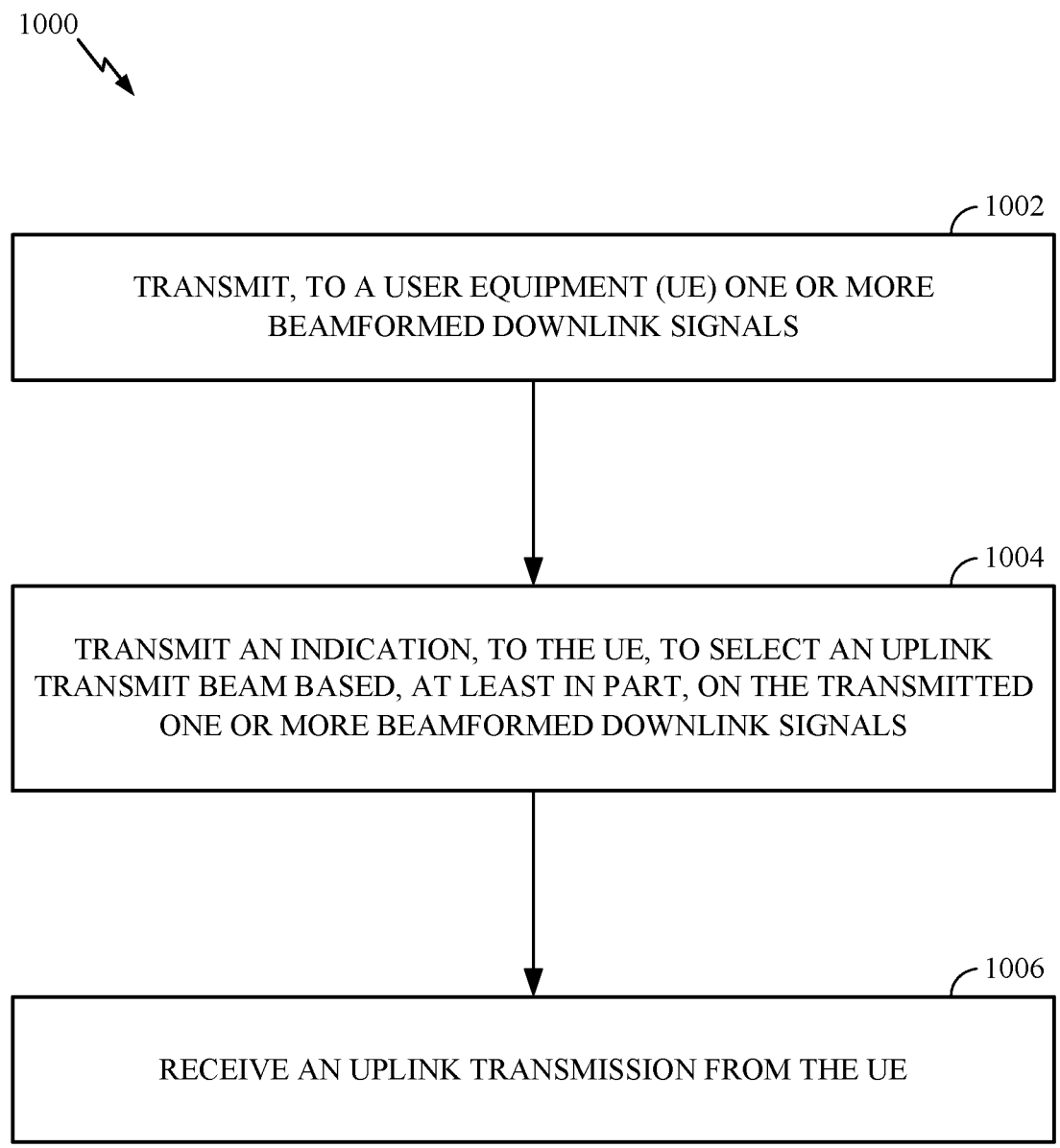
FIG. 10 illustrates example operations performed by a B S, in accordance with certain aspects of the present disclosure.

FIG. 10 illustrates example operations 1000, which may be performed by BS, according to aspects of the present disclosure. The BS may include one or more modules of BS 110 illustrated in FIG. 4.

At 1002, the BS may transmit, to a UE, one or more beamformed downlink signals. At 1004, the BS may transmit an indication, to the UE, to select an uplink transmit beam based, at least in part, on the transmitted one or more beamformed downlink signals. At 1006, the BS may receive the uplink transmission from the UE. In some cases, the indication may be transmitted in downlink control information (DCI). In other cases the indication may be transmitted using an RLC, a MAC CE, etc.

According to aspects, a BS may indicate to a UE to transmit a PUCCH and/or PUSCH based on the receive beam used at the UE to receive a DL CSI-RS/synchronization signal (SS) port. For example, and as illustrated in FIG. 8, the transmitter may have multiple CSI-RS and SS ports. For each CSI-RS and/or SS port, the UE may use a corresponding receive beam at the UE to receive the transmitted downlink signal. The UE may use an uplink transmit beam which is derived from a receive beam used to receive CSI-RS signal or a port QCL to the CSI-RS/SS port. In one example, the BS may indicate to the UE to transmit an uplink signal using a transmit beam which corresponds to a single CSI-RS/SS port set. Stated otherwise, the selected transmit beam is associated with or is the same as the receive beam used to receive the CSI-RS/SS signal or a DL signal transmitted by a port QCL to the CSI-RS/SS port in the reciprocal sense.

In another example, the BS may indicate to the UE to transmit an uplink signal using a transmit beam that may be derived from received beams corresponding to each CSI-RS port set. In this example, each DL beam may be associated with multiple ports (which define a port set). Accordingly, the UE may choose, from a collection of indicated CSI-RS port sets, one or more transmit beams for PUCCH/PUSCH based, at least in part on many UE receive beams.

The UE may select the transmit beam based on several metrics such as, for example, signal-to-noise ratio (SNR) and/or reference signal receive power (RSRP) measured for different beams corresponding to different port sets. In some cases, for example, a UE may determine that a signal to noise ratio (SNR) of the selected transmit beam is greater than a SNR of a previously selected uplink transmit beam by a threshold amount. Additionally or alternatively, the UE may select the transmit beam based on PUCCH/PUSCH transmit power. In some cases, the UE may determine an amount of transmit power needed for an uplink transmission. In some cases, the UE may determine a transmit power of a selected uplink transmit beam is less than a maximum transmit power of the UE by a threshold amount. If a beam has a strong SNR, but does not have enough power headroom, the UE may select another transmit beam. Accordingly, the UE may not always select a transmit beam associated with a highest measured SNR/RSRP. The UE may, instead, select a beam that may accommodate the transmit power needed for the UL transmission.

In some cases, the "conditions" (which may be referred to as Events e.g., A3 events in LTE) in which UE may choose the transmit beam may be signaled by the BS. For example the condition for choosing the beam may be signaled by the BS. One example condition (or Event) is to choose the beam that will use a transmit power that is ThresdB away from UE's maximum transmit power (i.e. UeTxPwr<MaxTxPwr−ThresdB). This threshold dB value (ThresdB) may also be signaled to UE. Another "condition" may be that a selected uplink transmit beam, Beam 2, may be used only when the determined SNR of Beam 2, is HystRTheshdB greater than the SNR of Beam 1, when Beam 1 was used in the previous transmission. Which condition the UE should use and the corresponding threshold value(s) may be signaled to UE.

The UE may indicate to the BS the CSI-RS port set which corresponds to the BS's selected PUCCH/PUSCH transmit beam. Additionally or alternatively, the UE may indicate the uplink transmit beam used for the transmission. For example, the UE may indicate that it is transmitting using UL beam X, which corresponds to CSI-RS port set Y.

In some cases, CSI-RS/SS port set $P_{Data}$ may be QCL with ports used for PDSCH transmission. CSI-RS/SS port set $P_{Control}$ may be QCL with ports used for PDCCH transmission. The BS may indicate to the UE to use beams corresponding to $P_{Control}$ for PUCCH transmission. The UE may receive PDCCH control information from $P_{Control}$ using one or more receive beams. The UE may select a best receive beam corresponding to $P_{Control}$. The best beam may have been pre-computed in previous training instances. The UE may transmit PUSCH/PUCCH using a transmit beam that is associated with one or more of the receive beams, such as the best receive beam and/or a transmit beam having enough power headroom for the uplink transmission.

In some cases, as described above, CSI-RS/SS port set $P_{Data}$ may be QCL with ports used for PDSCH transmission. CSI-RS/SS port set $P_{Control}$ may be QCL with ports used for PDCCH transmission. However, the BS may indicate to the UE to beams corresponding to either $P_{Data}$ or $P_{Control}$ for PUSCH/PUCCH transmission.

The UE may have pre-computed the best receive beam for each of $P_{Data}$ and $P_{Control}$ in a previous training instance. This information may be used, in combination with other metrics to select a best receive beam. For example, the UE may identify a SNR/RSRP of $P_{Data}$ was higher than a SNR/RSRP of $P_{Control}$. In response, the UE may transmit using a beam corresponding to a received PDSCH transmission.

In some cases, the UE may be close to using its maximum transmit power when the UE uses a PDCCH receive beam corresponding to $P_{Control}$ for UL transmission. However, the UE may have some headroom if it uses a PDSCH receive beam for UL transmission. Accordingly, the UE may choose to use a PDSCH receive beam for PUCCH (e.g., select to use a transmit beam associated with the PDSCH receive beam).

In some cases, the UE may receive two or more control beams. A first control beam may be transmitted by a BS using port set 1 and a second control beam may be transmitted by a BS using port set 2. The UE may select a receive beam between the beams used to receive the signals from port set 1 and port set 2. The UE may transmit PUCCH/PUSCH using a transmit beam associated with, for example, the stronger receive beam. Similarly, the UE may receive two or more data beams, wherein a first data beam is transmitted by a BS using port set 1 and a second data beam is transmitted by a BS using port set 2. In response, the UE may select a transmit beam based on a stronger received DL data signal. Additionally, the UE may form a composite beam which is derived from one or more of the receive beams.

In some cases, a BS and UE may have default agreement that a UE may use a transmit beam which corresponds to a previously-transmitted DL signal. The BS may transmit a downlink signal. If the UE does not have time or is unable to determine the ports used by the BS to transmit the signal, the UE may transmit the UL signal based on a previously-received DL signal. Thus, the UE may use the receive beam used to receive a previous DL signal to determine the transmit beam for PUSCH/PUCCH.

A BS is configured to monitor and receive the UL signal from the UE. For example, the BS may know the UE is selecting the UL transmit beam based on DL transmissions and/or identified port sets. Accordingly, the BS may monitor UL signals using beams/ports used to receive previously-transmitted UL signals from the UE and using the port sets indicated to the UE.

Thus, aspects described herein allow a UE to determine a transmit beam to use for UL communication on a PDCCH and/or PDSCH based, at least in part, on received downlink signals.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving, from a base station (BS), one or more beamformed downlink signals using one or more receive beams;
   selecting an uplink transmit beam based, at least in part, on the one or more beamformed downlink signals and one or more downlink port sets associated with the one or more beamformed downlink signals; and
   transmitting an uplink signal using the uplink transmit beam.

2. The method of claim 1, wherein selecting the uplink transmit beam is based on one or more of a physical downlink control channel (PDCCH) beam or a physical downlink shared channel (PDSCH) beam.

3. The method of claim 1, wherein selecting the uplink transmit beam is based on an explicit signaling in a downlink control information (DCI).

4. The method of claim 1, wherein selecting the uplink transmit beam comprises:
   determining the UE has reached a maximum power limit based on a physical downlink control channel (PDCCH) beam being selected; and
   selecting a physical downlink shared channel (PDSCH) beam based on the determination, wherein an available power headroom of the selected PDSCH beam accommodates a transmit power requirement.

5. The method of claim 1, wherein receiving the indication comprises:
   receiving an indication to select the uplink transmit beam based, at least in part, on at least two downlink port sets associated with the one or more beamformed downlink signals.

6. The method of claim 1, wherein the uplink transmit beam is derived from one more of the receive beams.

7. The method of claim 1, wherein the selecting comprises:
   determining a signal to noise ratio (SNR) for the received one or more beamformed downlink signals, and wherein
   the uplink transmit beam is associated with a highest determined SNR.

8. The method of claim 1, further comprising:
determining an uplink transmit power requirement for the uplink signal, and wherein
an available power headroom for the uplink transmit beam accommodates the transmit power requirement.

9. The method of claim 1, wherein the selecting comprises:
selecting the uplink transmit beam based, at least in part on a second beamformed downlink signal received before the one or more beamformed downlink signals.

10. The method of claim 1, further comprising:
transmitting an indication of a downlink port set associated with the uplink transmit beam.

11. The method of claim 1, further comprising:
receiving, from the BS, at least one condition associated with selecting the uplink transmit beam.

12. The method of claim 11, further comprising:
receiving, from the B Sat least one threshold value for the at least one condition associated with selecting the uplink transmit beam.

13. The method of claim 11, wherein the at least one condition comprises:
determining a transmit power of the uplink transmit beam is less than a maximum transmit power of the UE by a threshold amount.

14. The method of claim 11, wherein the at least one condition comprises:
determining a signal to noise ratio (SNR) of the selected transmit beam is greater than a SNR of a previously selected uplink transmit beam by a threshold amount.

15. The method of claim 1, wherein the selecting an uplink transmit beam is based on at least one of a spatial receive filter used to receive a downlink signal or a spatial receive beam used to receive a downlink signal.

16. A method for wireless communication comprising:
transmitting, to a user equipment (UE) one or more beamformed downlink signals;
transmitting an indication, to the UE, to select an uplink transmit beam based, at least in part, on the transmitted one or more beamformed downlink signals and on one or more downlink port sets associated with the one or more beamformed downlink signals; and
receiving an uplink transmission from the UE.

17. The method of claim 16, wherein transmitting the indication comprises:
transmitting an indication to select the uplink transmit beam based, at least in part, on at least two downlink port sets associated with the one or more beamformed downlink signals.

18. The method of claim 16, wherein the one or more downlink port sets are quasi co-located (QCL) with antenna ports used to transmit one or more downlink reference signal.

19. The method of claim 16, further comprising:
determining, based on the indication, possible uplink transmit beams for the uplink transmission; and
monitoring at least a subset of the possible uplink transmit beams for the uplink transmission.

20. The method of claim 16, further comprising:
receiving, from the UE, an indication of the uplink transmit beam.

21. The method of claim 16, further comprising:
receiving, from the UE, an indication of a DL port set associated with the uplink transmit beam.

22. The method of claim 16, wherein transmitting the indication further comprises:
transmitting at least one condition associated with selecting the uplink transmit beam.

23. The method of claim 22, wherein transmitting the indication further comprises:
transmitting at least one threshold value for the at least one condition associated with selecting the uplink transmit beam.

24. The method of claim 22, wherein the at least one condition comprises:
determining a transmit power of the uplink transmit beam is less than a maximum transmit power of the UE by a threshold amount.

25. The method of claim 22, wherein the at least one condition comprises:
determining a signal to noise ratio (SNR) of the selected transmit beam is greater than a SNR of a previously selected uplink transmit beam by a threshold amount.

26. An apparatus for wireless communications by a user equipment (UE), comprising:
a memory; and
a processor coupled with the memory, the memory and the processor configured to:
receive, from a base station (BS), one or more beamformed downlink signals using one or more receive beams;
receive an indication to select the uplink transmit beam based, at least in part, on one or more downlink port sets associated with the one or more beamformed downlink signals;
select an uplink transmit beam based, at least in part, on the one or more beamformed downlink signals and the one or more downlink port sets; and
transmit an uplink signal using the uplink transmit beam.

27. An apparatus for wireless communications, comprising:
a memory; and
a processor coupled with the memory, the memory and the processor configured to:
transmit, to a user equipment (UE) one or more beamformed downlink signals;
transmit an indication, to the UE, to select an uplink transmit beam based, at least in part, on the transmitted one or more beamformed downlink signals and on one or more downlink port sets associated with the one or more beamformed downlink signals; and
receive an uplink transmission from the UE.

* * * * *